April 16, 1935.  J. E. WARRELL  1,997,843
METHOD AND APPARATUS FOR PRODUCING OPENINGS IN MULTI-PLY FLEXIBLE MATERIALS
Filed July 14, 1934
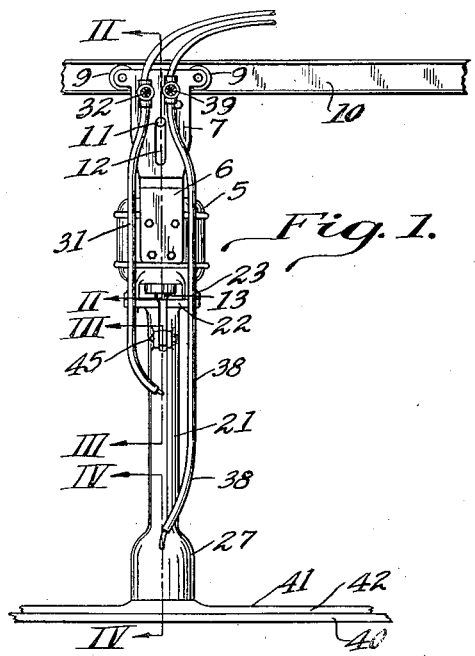
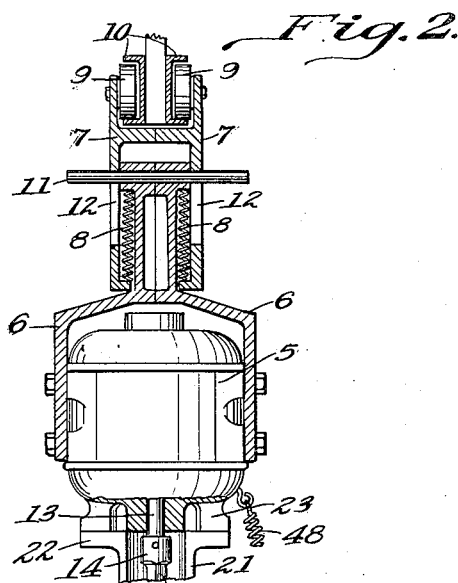
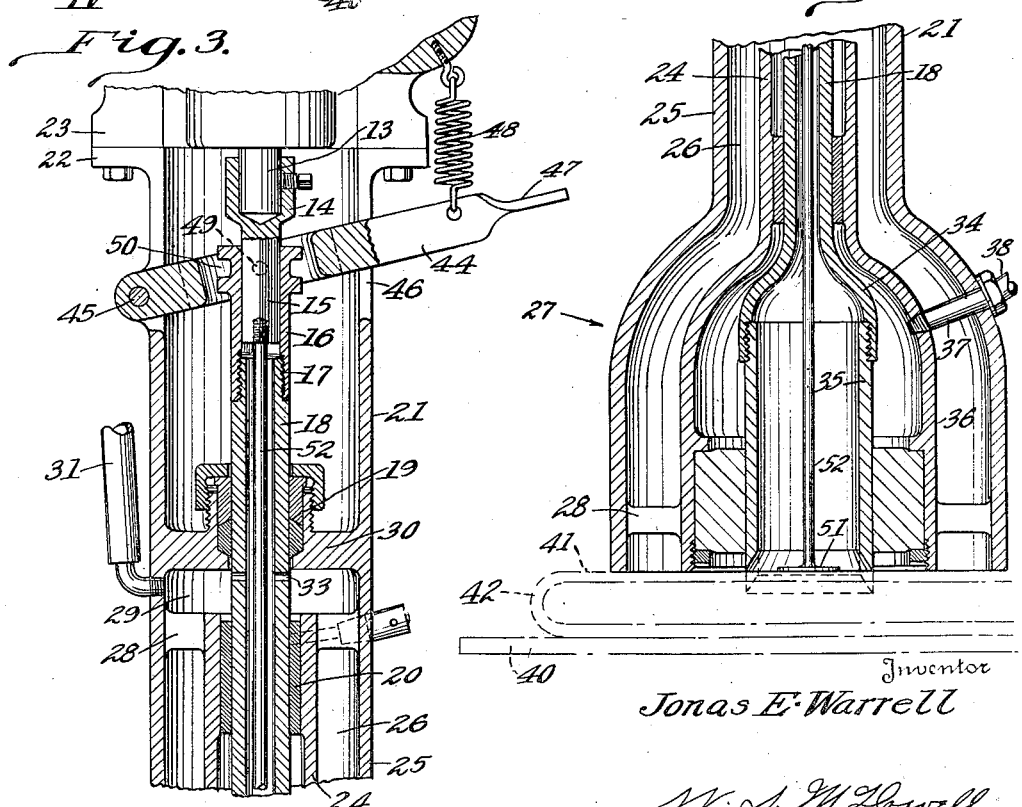
Inventor
Jonas E. Warrell
By
Attorney Patented Apr. 16, 1935

1,997,843

UNITED STATES PATENT OFFICE 1,997,843

METHOD AND APPARATUS FOR PRODUCING OPENINGS IN MULTI-PLY FLEXIBLE MATERIALS

Jonas E. Warrell, Newark, Ohio, assignor to The Pharis Tire & Rubber Company, Newark, Ohio, a corporation of Ohio Application July 14, 1934, Serial No. 735,265

18 Claims. (Cl. 164—86)

This invention relates to an improved method and apparatus for producing openings in multiple layer flexible materials, such as rubber, leather, paper compositions and the like, and the invention is particularly directed to the formation of openings in rubber articles, such as the inner tubes of pneumatic tires for motor vehicles, toy balloons, balls and the like.

It is an object of the invention to provide for the rapid cutting or drilling of openings in at least one of the layers of a multi-ply rubber body without cutting, injuring or marring another adjacent layer or layers of such material.

In accordance with the present invention, use is made of a cutting head in which a rotatable cutting element is mounted, and wherein the head around the cutting member is formed with an open chamber in which, during operation, a suction or sub-atmospheric pressures are maintained, whereby the cutting head on being placed upon a layer of flexible material in which an opening is to be formed, functions to cause said layer to be lifted or separated from a second adjoining layer and spaced from the latter, so that the cutting operation may take place solely on the first layer with which the head is engaged and injury to the second layer avoided.

Other objects of the invention reside in the provision of a cutting head wherein is included an axially disposed tubular cutting tool mounted for limited movement in an axial direction to cause the circular cutting edge of the tool to penetrate the material in which an opening is to be made in order to cut from such material a circular blank which is subsequently removed and leaves an opening of desired diameter in the layer of the flexible material upon which the cutting operation has taken place; in the provision of means for maintaining a suction or sub-atmospheric pressure in the operation of the apparatus within the tubular cutting tool in order to hold the work in proper contact with the cutting edge of the tool and facilitate the removal of the cut blank removed from such material by the operation of the cutting tool; in the provision of means for applying moisture to the cutting edge of said tool during its active operation to facilitate its cutting action, especially on rubber; in the provision of means for enabling the apparatus to be moved bodily in a longitudinal direction to adapt the same to manufacturing processes wherein the flexible material to be cut is advanced on conveyor belts or the like, and various other improvements which will be in part obvious and in part pointed out hereinafter.

For a further understanding of the invention, reference is to be had to the following description and the accompanying drawing, wherein:

Fig. 1 is a view in side elevation of the cutting apparatus constituting the present invention;

Fig. 2 is a vertical sectional view taken through the upper supporting portion of the apparatus on the plane indicated by the line II—II of Fig. 1;

Fig. 3 is a similar view taken through the motor drive mechanism of the apparatus on the plane indicated by the line III—III of Fig. 1;

Fig. 4 is a vertical sectional view through the cutting head of the apparatus on the line IV—IV of Fig. 1.

Referring more particularly to the drawing, the apparatus for carrying out the present invention comprises an electric motor 5, or other equivalent power applying means for effecting the rotation of a cutter to be hereinafter described. In the specific embodiment of the invention illustrated, the motor is supported by connecting with its housing a pair of brackets 6 which have their upper ends arranged within a pair of hangers 7 and resiliently supported therein for limited vertical movement by means of coil springs 8. The upper ends of the hangers are equipped with rollers 9 movable in a suspended stationary trackway which includes a pair of opposed channel members 10. The upper ends of the brackets 6 may be provided with a horizontally extending rod 11, the outer ends of which project through vertical slots 12 formed in the hanger 7, the ends of the rods 11 being projected beyond the sides of the hangers in order that they may be grasped by an operator to move the motor and the parts connected therewith bodily in a downward direction.

The armature shaft 13 of the motor has connected therewith a short shaft extension 14 having squared shank surfaces, as indicated at 15. This shank receives a sleeve 16 internally formed to correspond with the cross sectional formation of the shank 15, and threadedly connected as at 17 with the lower end of the sleeve 16 is a tube 18. This tube is formed for rotation in unison with the shaft 13, the shaft extension 14 and the sleeve 16, and is rotatably received within a packed gland or stuffing box 19 and an anti-friction bearing 20. The parts 19 and 20 are arranged within a vertically disposed tubular casing 21, provided with a flanged upper end 22 which is adapted to be suitably and stationarily secured to the motor housing, as indicated at 23.

The casing 21 includes spaced inner and outer concentric walls 24 and 25 respectively, there being an annular suction chamber 26 formed between said walls. At its lower end, the casing 21 is of a large diameter to produce a working head 27, as disclosed in Fig. 4, the walls 24 and 25 being united at intervals by transversely extending ribs 28. The chamber 26 at its lower end is open to the atmosphere while the upper end thereof communicates with a compartment 29 disposed immediately beneath a web 30 arranged transversely within the casing 21 and within which web the stuffing box 19 is formed. The compartment 29 communicates with a flexible or other type of conduit 31 in which is provided a regulating valve 32, the said conduit 31 leading to a fan, pump or other suitable suction producing device, not shown. In registration with the compartment 29, the tube 18 is provided with perforations 33 by means of which suction or subatmospheric pressures may likewise be produced or maintained within said tube.

The lower end of the tube 18, within the working head 27, is enlarged in diameter, as indicated at 34, and is internally threaded for the reception of a tubular cutter or drill 35, the lower edges of which being sharpened to provide an annular cutting element. Between the inner wall 24 of the head 27 and the outer surface of the cutter 35, there is provided a ring or pad 36 of a water absorbent material, and entering the head 27 immediately above the ring or pad 36 is a water supply pipe 37, leading from a suitable source of water supply by means of a flexible conduit 38 associated with the traveling hanger 7, said conduit being provided with a control valve 39. By the employment of the pad 36, a regulated supply of water may be delivered to the cutting edge of the tool 35, since the wetting of a cutting edge has been found to facilitate the cutting of rubber. The water delivered to the pad 36 flows down the outer surfaces of the cutter 35 to the cutting edge at the bottom thereof.

In the use of this apparatus, the rails 10 are preferably mounted over a traveling conveyor belt 40 on which flexible materials to be cut or perforated are positioned while being passed from one manufacturing operation to another, for instance, in the manufacture of rubber tire tubes. Such tubes constitute instances of multiple ply flexible materials upon which the invention may operate to advantage. In producing an opening in but one layer of an inner tube, the entire tool is forced downwardly against the resistance of the springs 8 until the bottom of the working head 27 contacts with the upper layer 41 of an inner tube 42 disposed on the belt conveyor 40. This sets up a partial vacuum within the annular chamber 26 and the tubular cutter 35 so that when the cross rod 11 is released, the motor 5 and its connected parts will move upwardly in response to the action of the springs 8, which results in lifting the upper layer 41 of the inner tube from contact with the lower layer 43 thereof. While the upper layer 41 is thus held by atmospheric pressure, working against the subatmospheric pressures within the head 27, in firm contact with the lower edges of the head 27, the cutter 35 is advanced to penetrate the upper layer 41 and to produce a circular opening therein. This advancement of the cutter 35 may be accomplished by providing the upper end of the casing 21 with a lever 44 pivoted to said casing as at 45 and having its opposite end extending through a vertical slot 46 and provided with a manipulating portion 47. A coil spring 48 is connected with the portion 47 of said lever and the motor frame or housing, and normally maintains the lever in an elevated position. The central portion of the lever is formed with a pair of inwardly projecting pins 49 which are receivable within an annular groove 50 provided in the sleeve 16 of the cutter tube 18. It will be seen that by depressing the handle 47 of said lever, the latter will be moved against the resistance of the spring 48 to lower the cutter tube assembly, causing the lower edges of the revolving cutter 35 to penetrate the upper layer 41 of the inner tube to produce an opening therein. Since, however, the upper layer 41 of the inner tube is spaced from the lower layer 43 thereof, the throw of the cutter in an axial direction will be insufficient to cause engagement of the cutter with the bottom layer. Following the formation of said opening, the lever 44 is released and the cutter returned to its normal position under the influence of the spring 48. The elevation of the cutter to its normal position causes the blank of rubber or other flexible material so removed to engage with the headed end 51 of a rod 52, so that the blank may be forced out from the confines of the cutter and easily removed by the operator.

In view of the foregoing, it will be seen that the present invention provides a vacuum cutter or drill to facilitate the formation of openings of proper or desired size in a flexible material such as rubber, leather, or the like which is of multiply formation and wherein it is desired to cut only one layer or ply of the material. The construction of the apparatus is such that the establishment of a partial vacuum therein will lift the material to be cut from an under-lying layer, so that the layer of the material in contact with the cutting apparatus only will be cut and not the under-lying materials. In the cutting of rubber especially, I desire to employ the means for admitting water or other fluid cutting compound to the annular knife edge of the cutter or drill 35, since I have found that this feature greatly facilitates a rubber cutting operation. The partial pressures or suction within the cutting head may be obtained from outside sources which may or may not be defined by the motor 5. Also, it is within the scope of the invention to operate the drill by means of flexible shafts or other types of drives in lieu of mounting the motor directly in connection with the cutting element. The entire apparatus is mounted so that it may move longitudinally in conformity with the movement of a conveyor belt on which the articles to be cut are deposited.

While I have shown apparatus suitable for carrying out the ends and purposes of the present invention, nevertheless it will be appreciated by those skilled in the art that the construction illustrated and described is subject to considerable modification without departing from the spirit and scope of my invention as the latter has been defined in the following claims:

What is claimed is:

1. Apparatus for producing openings in flexible materials comprising a tubular cutter, an open-bottomed casing in which said cutter is rotatably mounted, and means for establishing subatmospheric pressures within said casing when the latter is in contact with the material to be cut to hold said material without other support in contact with the casing with sufficient permanency to enable said cutter to penetrate said material.

2. Apparatus for producing openings in flexible materials comprising a working head having an open bottom, a tubular cutter rotatably and reciprocably mounted within said working head and provided with a knife edge, and means for creating sub-atmospheric pressures within said head when the latter is in contact with material to be cut by said cutter to temporarily retain said material without other support in contact with said head to permit of the penetration of the knife edge of the cutter into said material.

3. Apparatus for cutting openings in flexible materials comprising a cutting head including spaced inner and outer concentric walls forming an open-bottomed chamber therebetween, a tubular cutter rotatably supported in the longitudinal axis of said head and spaced from said inner wall, means for maintaining sub-atmospheric pressures in the chamber of said head formed between the inner and outer walls thereof when said head is in contact with materials to be cut, and means for moving said cutter longitudinally of the axis of said head to bring said cutter to penetrating relationship with materials engaged with said head.

4. In apparatus for cutting openings in flexible materials comprising an open-bottomed working head including spaced inner and outer concentrically arranged walls, means for maintaining sub-atmospheric pressures in the space formed between said walls to retain flexible material in contact with the bottom of said head, a tubular cutter rotatably mounted in the axis of said head, and means for moving said cutter longitudinally of said axis to cause the lower edge thereof to project beyond the plane defining the bottom of the working head, whereby to penetrate materials in contact with said head.

5. Apparatus for cutting openings in flexible materials comprising a working head including spaced inner and outer concentric walls, the lower edges of said walls terminating in a common horizontal plane, means for maintaining sub-atmospheric pressures within the space formed between said walls when the lower edges of the latter are in contact with flexible material to be cut, a tubular cutter having its lower end formed with a knife edge mounted for rotation in the axis of the working head and spaced from the inner wall thereof, said cutting edge being normally positioned in registration with the horizontal plane defining the bottom of the working head, means for rotating said cutter, and means operable during the rotation of said cutter for projecting the cutting edges thereof beyond the plane of the bottom of the working head.

6. Apparatus of the class described comprising a working head including spaced inner and outer walls evenly terminated at the lower end of said head, means for producing a partial vacuum in the space formed between said walls when the lower end of said head is in engagement with flexible material to be cut, a tubular cutter having an annular knife edge at the lower end thereof, means for mounting said cutter for rotation in the longitudinal axis of said head and in spaced relation from the inner wall of the head, manually controlled means for advancing the cutting edge of said cutter beyond the plane defining the bottom of said head, and means for supplying a cutting fluid to the cutting edge of said cutter during the rotation of the latter.

7. In apparatus of the class described, a working head having spaced inner and outer walls, the lower ends of said walls terminating in a common horizontal plane, a tubular cutter mounted for rotation within said head, means for rotating said cutter, means for moving said cutter longitudinally of said head to cause the cutting edges thereof to project beyond the horizontal plane defining the bottom of said head, and means for maintaining sub-atmospheric pressures in the space formed between the inner and outer walls of said head and the interior of said cutter while said head is in contact with flexible material in which an opening is to be formed.

8. Apparatus for producing openings in multi-layer rubber articles comprising a working head including spaced stationary inner and outer walls having their lower edges terminated in a common horizontal plane, a tubular cutter mounted for rotation within the axis of said head and normally lying within the confines of the latter, means for rotating said head, manually controlled means for projecting the cutting edge of said cutter beyond the confines of said head to penetrate material engaged with the head, means for maintaining sub-atmospheric pressures within said cutter and within the space formed between the inner and outer walls of said head to hold material by pressure differential in contact with said head.

9. Apparatus for producing openings in multi-layer rubber articles comprising a working head including spaced stationary inner and outer walls having their lower edges terminated in a common horizontal plane, a tubular cutter mounted for rotation within the axis of said head and normally lying within the confines of the latter, means for rotating said head, manually controlled means for projecting the cutting edge of said cutter beyond the confines of said head to penetrate material engaged with the head, means for maintaining sub-atmospheric pressures within said cutter and within the space formed between the inner and outer walls of said head to hold material by pressure differential in contact with said head, and means carried by said head for supplying the cutting edge of said cutter with a liquid during rotation thereof.

10. In apparatus for producing an opening in the upper layer of a rubber body containing a plurality of layers, a working head including spaced inner and outer walls, the lower edges of said walls terminating in a common horizontal plane, a tubular cutter normally disposed within said head and spaced from the inner wall thereof, means for rotating said cutter, manually operated means for projecting the cutting edge of said cutter during rotation thereof beyond the plane defining the lower edges of the working head walls, means for establishing sub-atmospheric pressures within said cutter and the space formed between the walls of the working head to maintain the layer of material to be cut in engagement with the bottom of said head by pressure differential, and a blank ejector arranged in the axis of said head and within said cutter.

11. Apparatus for cutting holes in multiple layer flexible materials comprising a stationary support, a carriage movable longitudinally of said support, a cutter head depending from said carriage for vertical adjustment with respect to the carriage, a tubular cutter rotatably mounted within said head, and means for maintaining sub-atmospheric pressures within said head to hold material in contact therewith and said cutter through pressure differential on opposite sides of said material.

12. Apparatus for cutting openings in flexible materials comprising a supporting rail, a carriage movable longitudinally of said rail, a motor mounted for vertical movement relative to said carriage, a cutter head depending from said motor, a tubular cutter rotatably mounted within said head, means driven by said motor for effecting the rotation of said cutter, means for establishing sub-atmospheric pressures in said cutter head to maintain flexible material in engagement with the bottom thereof and said cutter, and means for moving said cutter longitudinally with respect to the cutter head to cause said cutter to penetrate the material engaged with said head.

13. The structure as specified in claim 12 in connection with means for supplying a liquid to the cutting edge of the cutter during rotation thereof.

14. In apparatus for producing openings in flexible materials, in combination, a traveling conveyor on which the material to be cut is positioned, a stationary elevated support arranged over and extending parallel to said conveyor, a carriage movable longitudinally of said support, a cutter head supported by said carriage for vertical movement toward and away from material arranged on said conveyor, a cutter rotatably supported in said head to produce openings in the material positioned on said conveyor, and means formed in conjunction with said cutter head for establishing sub-atmospheric pressures therein whereby to maintain said material in contact with the cutter head during the operation of said cutter.

15. The method of producing openings in multiple layer flexible materials, comprising subjecting a localized portion of said materials in which an opening is to be formed to unbalanced pressures to separate the affected layer of the material from an adjoining layer, and while the affected layer is lifted from engagement with the adjoining layer, cutting an opening therein.

16. The method of producing openings in multiple layer flexible materials which consists in applying a suction force to a localized area of the upper layer of such flexible materials to effect the elevation of said upper layer and the spacing thereof from an adjoining lower layer, and, while said upper layer is so spaced, cutting an opening therein.

17. The method of cutting openings in multiple layer rubber objects, which consists in applying a suction producing force to a localized portion of the upper layer of such an object to cause a separation and spacing of the upper layer from an adjoining lower layer, cutting an opening in the localized area of the upper layer while the latter is maintained under the influence of said suction producing force, and continuously supplying a liquid to the upper layer during the cutting of the opening therein.

18. The method of producing openings in rubber articles which consists in advancing said articles in a longitudinal direction, during the advance of said articles applying to a localized area thereof a suction producing force to effect elevation of said area above its normal plane while traversing said course and without interrupting the longitudinal advance of the articles along said course, whereby to hold the localized areas of said rubber articles so effected in pressure contact with a cutting instrumentality, and while the articles are held in contact with said instrumentality, cutting the same to produce openings therein.

JONAS E. WARRELL.